(12) United States Patent
Sakazume (10) Patent No.: US 12,282,139 B2
(45) Date of Patent: Apr. 22, 2025

(54) DISTANCE MEASURING DEVICE

(71) Applicant: SOMAR CORPORATION, Tokyo (JP)

(72) Inventor: Naoki Sakazume, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 0 days.

(21) Appl. No.: 18/701,419

(22) PCT Filed: Dec. 15, 2022

(86) PCT No.: PCT/JP2022/046224
§ 371 (c)(1),
(2) Date: Apr. 15, 2024

(87) PCT Pub. No.: WO2023/112990
PCT Pub. Date: Jun. 22, 2023

(65) Prior Publication Data
US 2024/0329278 A1    Oct. 3, 2024

(30) Foreign Application Priority Data

Dec. 17, 2021 (JP) .................................. 2021-204760

(51) Int. Cl.
*G02B 1/113* (2015.01)
*G01S 7/481* (2006.01)

(52) U.S. Cl.
CPC .......... *G02B 1/113* (2013.01); *G01S 7/4813* (2013.01)

(58) Field of Classification Search
CPC ........... G02B 1/113; G02B 1/111; G02B 1/11; G01S 7/4813; G01S 17/931; G01S 7/481
See application file for complete search history.

(56) References Cited

U.S. PATENT DOCUMENTS 6,852,376 B2 * 2/2005 Chien ...................... C09D 5/00
428/323
9,239,260 B2 1/2016 Bayha et al.
(Continued)

FOREIGN PATENT DOCUMENTS

JP    2012-242837 A    12/2012
JP    2016-45448 A     4/2016
(Continued)

OTHER PUBLICATIONS

Examiner provided machine translation of Boseki, JP 2019124911 A (Year: 2019).*
(Continued)

*Primary Examiner* — Balram T Parbadia
(74) *Attorney, Agent, or Firm* — Rankin, Hill & Clark LLP (57) ABSTRACT

A distance measuring device 1 capable of achieving high measurement accuracy is provided. The distance measuring device 1 comprises a LiDAR sensor unit 7 in a storage chamber 5 partitioned inside an exterior member 2. The LiDAR sensor unit 7 comprises a light emitting element 71 for emitting a detection light L1 for measuring a distance to an object, a light receiving element 73 for outputting a light-receiving signal S1 in accordance with an amount of an incident light, and a translucent cover 3 for covering the light emitting element 71 and light receiving element 73. Antireflection films 9a and 9b are provided at least on one main surface side of the translucent cover 3. The antireflection films 9a and 9b are configured by a membrane having a thickness of 2 μm or more and 40 μm or less formed from a liquid composition having a specific composition by spray coating.

17 Claims, 3 Drawing Sheets

(56) References Cited

U.S. PATENT DOCUMENTS

| | | |
|---|---|---|
| 11,448,730 B2 | 9/2022 | Etschmaier et al. |
| 2004/0008410 A1* | 1/2004 | Stam ................. H01L 27/14621 |
| | | 359/443 |
| 2007/0139780 A1* | 6/2007 | Suzuki ..................... G02B 5/30 |
| | | 359/586 |
| 2007/0206286 A1* | 9/2007 | Fukushige .............. G02B 1/111 |
| | | 359/580 |
| 2007/0212498 A1* | 9/2007 | Fukushige .............. G02B 1/111 |
| | | 428/1.31 |
| 2008/0013179 A1* | 1/2008 | Kobayashi ............. G02B 1/115 |
| | | 359/587 |
| 2010/0177397 A1* | 7/2010 | Kamiyama .............. H01J 11/44 |
| | | 359/609 |
| 2012/0316265 A1* | 12/2012 | Kubota ................... G02B 1/111 |
| | | 977/773 |
| 2014/0332676 A1 | 11/2014 | Bayha et al. |
| 2019/0146069 A1 | 5/2019 | Etschmaier et al. |
| 2020/0025890 A1* | 1/2020 | Morinaga ............... G01S 17/42 |
| 2021/0041534 A1* | 2/2021 | Egawa .................. G01S 7/4813 |
| 2021/0132199 A1* | 5/2021 | Mase .................... H10F 39/802 |
| 2022/0163696 A1* | 5/2022 | Tachibana ............... B32B 7/023 |
| 2022/0171104 A1* | 6/2022 | Nozawa ............... G02B 5/0268 |
| 2023/0029567 A1* | 2/2023 | Hosono .............. G02B 27/0101 |
| 2024/0159909 A1* | 5/2024 | Nakano ................. G01S 7/4816 |

FOREIGN PATENT DOCUMENTS

| | | |
|---|---|---|
| JP | 2018-049014 A | 3/2018 |
| JP | 2020-101471 A | 7/2020 |
| KR | 10-2021-0028428 A | 3/2021 |
| KR | 10-2021-0091237 A | 7/2021 |
| KR | 10-2021-0145770 A | 12/2021 |

OTHER PUBLICATIONS

International Search Report corresponding to International Application No. PCT/JP2022/046224 dated Feb. 21, 2023, 2 pages.
Korean Office Action dated Jul. 22, 2024 issued in corresponding Korean application No. 10-2024-7012391; English translation included (11 pages).
Chinese Office Action dated Aug. 31, 2024 issued in corresponding Chinese application No. 202280066712.6; English translation included (16 pages).

* cited by examiner

DISTANCE MEASURING DEVICE

This application is a U.S. national phase filing under 35 U.S.C. § 371 of PCT Application. No. PCT/JP2022/046224, filed on Dec. 15, 2022, which is hereby incorporated in its entirely by reference.

TECHNICAL FIELD

The present invention relates to a distance measuring device, which can be mounted on/installed in electronic apparatuses and mobile bodies.

BACKGROUND ART

As an example of a distance sensor mounted on a vehicle as a mobile body, a LiDAR (Light Detection and Ranging, Laser Imaging Detection and Ranging) sensor unit is known (Patent Document 1). This LiDAR sensor unit detects a distance to an object reflecting a light based on a flying time, so called ToF (Time of Flight), of a detection light from emission to receipt of a reflected light.

RELATED ART DOCUMENTS

Patent Document

Patent Document 1: Japanese Patent Unexamined Patent Publication (Kokai) No. 2018-49014

SUMMARY OF THE DISCLOSED SUBJECT MATTER

In a conventional LiDAR sensor unit as above, however, firstly, when a detection light emitted from a light emitting element passes a translucent cover, a reflection light toward the inner direction (inside the unit) arises at its inner surface and outer surface in some cases. When the reflection light enters a light receiving element and a light-receiving signal based on the reflection light is output from the light receiving element, it is recognized that an object is at a position of the inner surface or outer surface of the translucent cover, consequently, accuracy of measurement of a distance to an actual object deteriorates.

Secondly, when a reflection light from an object passes a translucent cover, a reflection light to the outer direction (outside the unit) arises at its inner surface or outer surface in some cases. Arising of the reflection light leads to deterioration of a light amount of a reflection light entering to a light receiving element, and there has been a possibility that accuracy of measurement of a distance to an object deteriorates also in this case in the same way as in the above.

The present invention was made in consideration with the circumstances above. The present invention has an object thereof to provide a distance measuring device capable of achieving high measurement accuracy.

The present inventors conducted studies diligently and found that when a translucent cover covering a light emitting element and a light receiving element of a distance measuring device fulfills the following requirements, it is effective to improve accuracy in measurement.

To use a liquid composition having a specific composition comprising a predetermined ratio of unevenness forming particles comprising, in a range of a predetermined mass ratio, large and small inorganic particles having particle diameters in predetermined ranges.

To use a liquid composition having a specific composition explained above to form an antireflection film having a predetermined thickness by a spray coating on at least one main surface side.

Based on these newly acquired knowledge, the present inventors completed the invention as provided below and attained the object above.

Below, (A) indicates a resin component, (B) unevenness forming particles, (B1) inorganic small particles having a particle diameter ($d_1$) of 0.05 μm or more and 0.4 μm or less, (B2) inorganic large particles having a particle diameter ($d_2$) of 2 μm or more and 6 μm or less, and (C) diluent solvent.

According to the present invention, there is provided a distance measuring device, comprising:
   a light emitting element for emitting a detection light for measuring a distance to an object;
   a light receiving element for outputting a light-receiving signal in accordance with an amount of an incident light; and
   a translucent cover for covering the light emitting element and light receiving element
   wherein:
   the translucent cover has an antireflection film at least on one main surface side;
   the antireflection film is configured by a membrane having a thickness of 2 μm or more and 40 μm or less formed from a liquid composition by spray coating;
   the liquid composition comprises at least (A), (B) and (C);
   (B) is contained in an amount of 20% by mass or more and 60% by mass or less in a total amount of 100% by mass of all solid content in the composition; and
   (B) comprises (B1) and (B2) in an amount of 90% by mass or more, and a mass ratio of (B2) with respect to (B1):1 is 1.8 or more and 3.3 or less.

The light emitting element and light receiving element, which are components of a distance measuring device, are a part of at least one selected from a group composed of a LiDAR sensor unit, ToF camera unit and a millimeter radar unit.

According to the present invention, there is provided an electronic apparatus or a mobile body comprising the distance measuring device.

As an electronic apparatus, for example, smartphones, tablet terminals, cellular phones, personal computers, game devices, television receivers, wearable terminals, digital still cameras, digital video cameras, etc. may be mentioned. As a mobile body, for example, vehicles (automobiles, electric cars, hybrid electric cars, motorcycles, bicycles and personal mobilities, etc.), airplanes (including drones), ships and robots, etc. may be mentioned.

According to the present invention, there is provided an antireflection film, formed at least on a translucent cover of a distance measuring device comprising the translucent cover, which covers a light emitting element for emitting a detection light for measuring a distance to an object and a light receiving element for outputting a light-receiving signal in accordance with an amount of an incident light, and
   the antireflection film is configured by a membrane having a thickness of 2 μm or more and 40 μm or less formed from a liquid composition by spray coating:
   wherein
   the liquid composition comprises at least (A), (B) and (C);
   (B) is contained in an amount of 20% by mass or more and 60% by mass or less in a total amount of 100% by mass of all solid content in the composition; and (B) comprises (B1) and (B2) in an amount of 90% by mass or more, and a mass ratio of (B2) with respect to (B1):1 is 1.8 or more and 3.3 or less.

An antireflection film provided by the present invention may be formed on a translucent cover of a distance measuring device and may be formed on other components. An example of the other components will be explained later on.

The light composition according to the above may include the modes below.

It is preferable that (B2) includes silica.

Silica preferably contains composite silica made into black color by a colorant.

It is preferable that (B1) contains carbon black.

Viscosity at 25° C. is preferably 1 mPa·s or more and 30 mPa·s or less.

The antireflection film explained above may include the modes below.

It is preferable that an outermost surface of a plane formed with a membrane has glossiness of less than 4% against an incident light with an incident angle of 85° (hereinafter, also simply referred to as "85°-glossiness"), reflectance of 6% or less against a light in a near infrared region (a wavelength of 905 nm) (hereinafter, also simply referred to as "reflectance"), and an optical density of 1.5 or more.

On an outermost surface of a plane formed with a membrane, it is preferable that a maximum height Rz (hereinafter, also simply referred to as "Rz") based on JIS B0601:2001 is 7 μm or more, an average length Rsm of contour curve elements (hereinafter, also simply referred to as "Rsm") is 80 μm or more, a skewness Rsk of a contour curve (hereinafter, also simply referred to as "Rsk") is 0.3 or less, and Kurtosis Rku of a contour curve (hereinafter, also simply referred to as "Rku") is 3 or more.

According to the present invention, there is provided a distance measuring device (a LiDAR sensor unit, a ToF camera unit and a millimeter-wave radar unit, etc.) capable of achieving high measurement accuracy.

EXEMPLARY MODE FOR CARRYING OUT THE DISCLOSED SUBJECT MATTER

Below, the best modes for carrying out the invention will be explained, however, the present invention is not limited to the modes below and also includes those obtained by suitably modifying or improving the modes explained below based on ordinary knowledge of persons skilled in the art within the scope of the present invention.

As to a range of value in the present specification, an uppermost value or a lowermost value described in certain value ranges may be replaced by values indicated in the examples.

In the present specification, when there are a plurality of kinds of substances falling under each component in a composition, a content ratio or a content in each component in the composition indicates a content ratio or a content of a total of the plurality of kinds of substances being in the composition unless otherwise mentioned.

Figure 1:
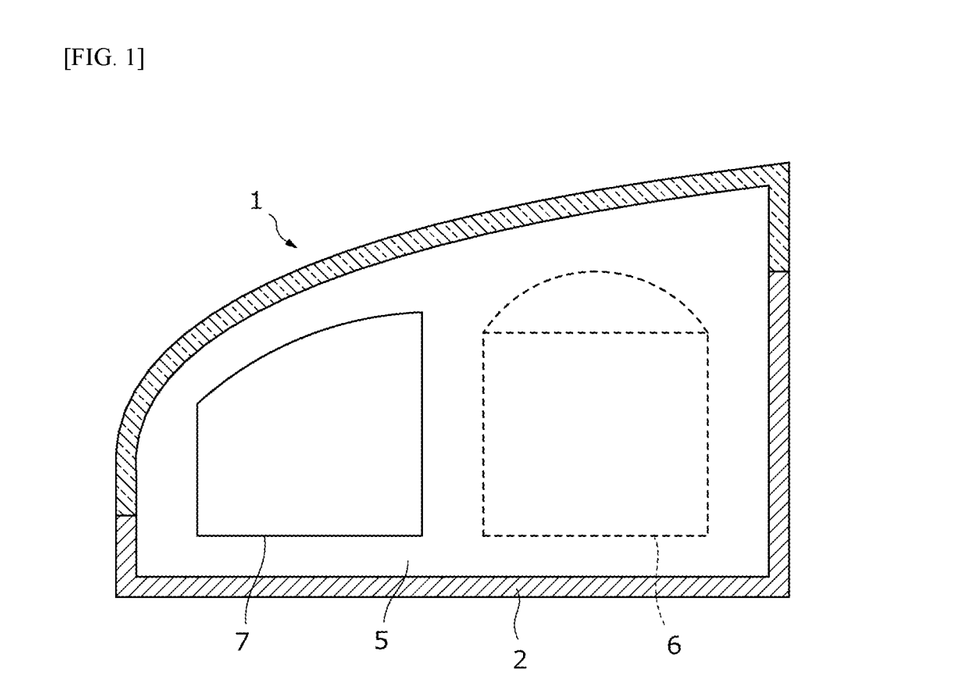
FIG. 1 is a sectional view showing an application example of a distance measuring device according to one mode of the present invention.

A distance measuring device 1 according to one mode shown in FIG. 1 shows an example of placing it at a front left part of a vehicle (on the left side of a center in the width direction of the vehicle and on the front side of a center in the longitudinal direction of the vehicle). The distance measuring device 1 comprises an exterior member 2, and the exterior member 2 partitions a storage chamber 5 therein.

A LiDAR sensor unit 7 is placed in the storage chamber 5. LiDAR is a sensor for measuring a distance to an object in a long distance by measuring a scattered light from a laser irradiation emitted in pulse.

Figure 2:
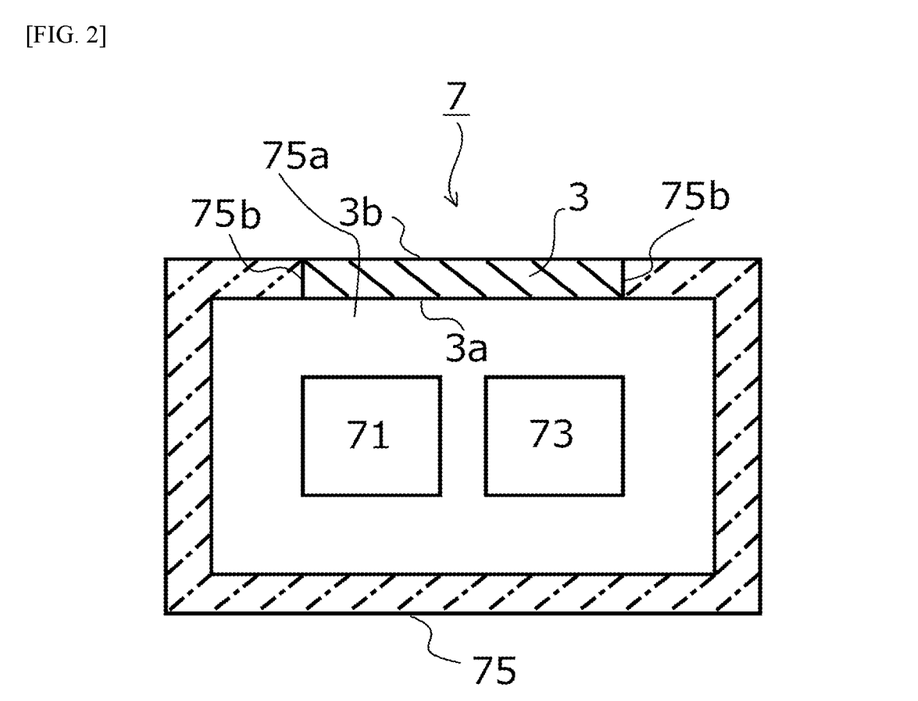
FIG. 2 is a view showing a configuration example of a LiDAR sensor unit used in a distance measuring device in FIG. 1.
Figure 3:
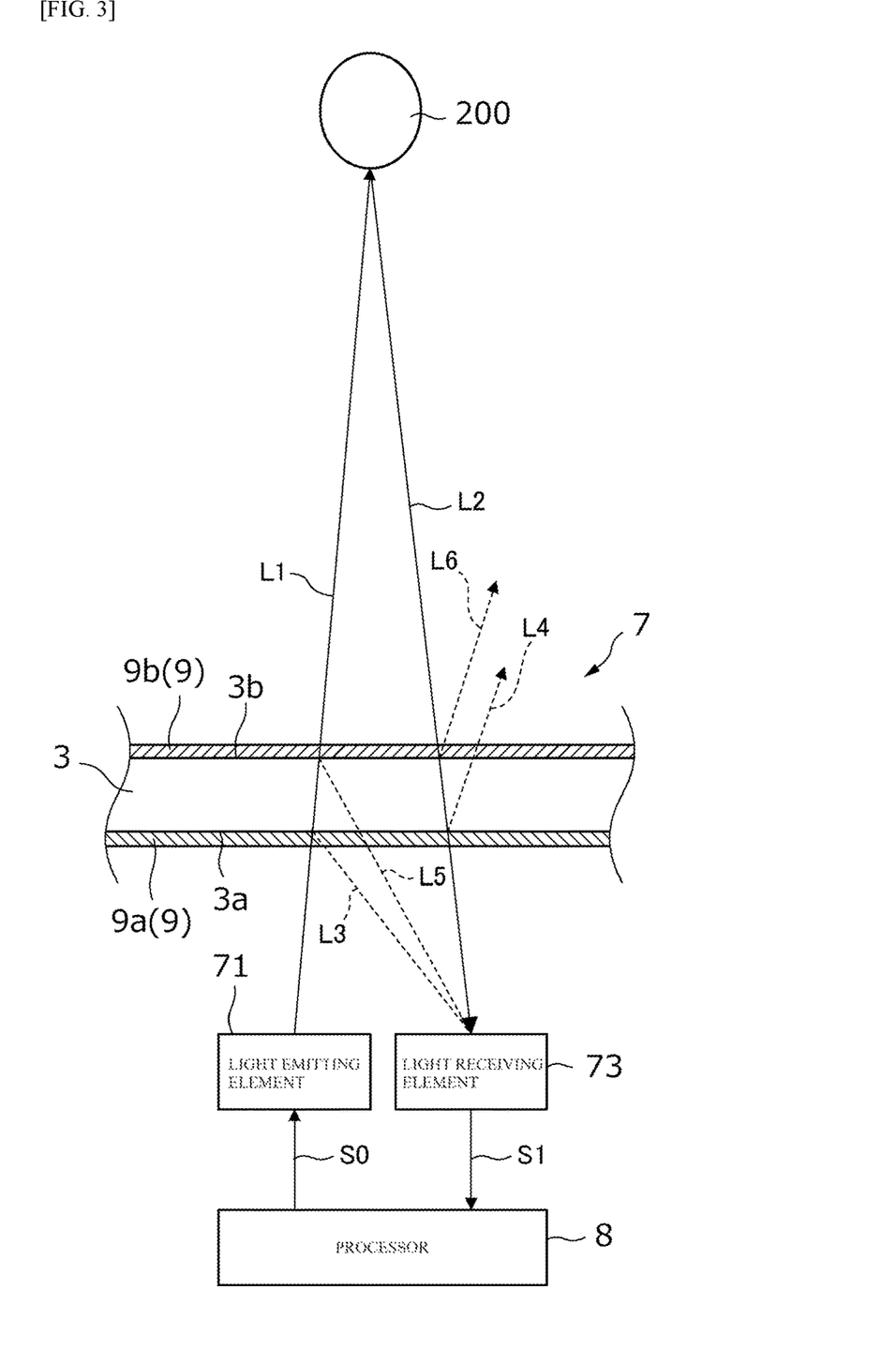
FIG. 3 is a view showing a configuration and effect/reaction of the LiDAR sensor unit in FIG. 2.

As shown in FIG. 2 and FIG. 3, a LiDAR sensor unit 7 comprises a light emitting element 71 and light receiving element 73 housed in a housing 75, a translucent cover 3 as a window portion covering an opening 75a of the housing 75. A translucent cover 3 in the present example does not compose a part of an outer surface of a vehicle, but it is not limited to this mode.

The translucent cover 3 is, as an example, a plate-shaped member made of glass or resin, is for closing an opening 75a of the housing 75 so as to cover a light emitting element 71 and a light receiving element 73, and is attached to an opening end surface 75b of the housing 75, for example, with an adhesive agent, etc. The translucent cover 3 has an optical characteristic of at least transmitting most (for example 99% or more) of a light in a wavelength band of a detection light L1 (for example, near infrared range) emitted from a light emitting element 71.

As a resin forming a base material of a translucent cover 3, for example, polycarbonate (PC) based resin, polyamide (PA) based resin, liquid crystal polymer (LCP), polyacetal (POM) based resin and other heat-resistant resins may be mentioned.

A base material of a translucent cover 3 may contain a pigment. A pigment to be contained is not particularly limited and, in the same way as later-explained (B1) and (B2), any of resin-based particles and inorganic-based particles may be used. As resin-based particles, for example, a melamine resin, benzoguanamine resin, benzoguanamine/melamine/formalin condensate, acrylic resin, urethane resin, styrene resin, fluoric resin, silicon resin, etc. may be mentioned. As inorganic-type particles, silica, alumina, calcium carbonate, barium sulfate, titan oxide, magnetite-based black, copper/iron/manganese-based black, titanium black, carbon black and aniline black, etc. may be mentioned. these pigments may be used alone or in combination of two or more kinds.

A content ratio of a pigment when containing a pigment in a base material of a translucent cover 3 may be set arbitrarily in accordance with required performance, etc. and is not particularly limited. It is, for example, 0.3% by mass or more, preferably 0.4% by mass or more and, for example, 15% by mass or less and preferably 12% by mass or less, or so in a base material.

A light emitting element 71 is configured to emit a detection light L1 toward an outside of a vehicle. As a detection light L1, for example, a near infrared light having a wavelength of 905 nm may be used. As a light emitting element 71, a laser diode, light-emitting diode and other semiconductor light-emitting elements may be used.

A LiDAR sensor unit 7 may comprise a optical system (not shown) for irradiating a detection light L1 to a desired direction and a scanning mechanism (not shown) for changing the direction of irradiating a detection light L1 to scan in a detection region.

A light receiving element 73 is configured to output a light-receiving signal S1 in accordance with an amount of an incident light. As a light receiving element 73, a photodiode, phototransistor and photoresistor, etc. may be used. A LiDAR sensor unit 7 may comprise an amplifying circuit (not shown) for amplifying a light-receiving signal S1.

A processor (control unit) 8 is arranged in a storage chamber 5. Or the processor 8 may be built in a housing 75 of a LiDAR sensor unit 7. The processor 8 outputs a control signal S0 to make a light emitting element 71 emits a detection light L1 at a desired timing. The processor 8 receives a light-receiving signal S1 output from a light receiving element 73.

The processor 8 calculates a distance to an object 200, which emits a reflection light L2, based on time from emission of a detection light L1 from a light emitting element 71 to incidence of a reflection light L2 at a light receiving element 73.

A lamp unit 6 is also arranged as well as a LiDAR sensor unit 7 in a storage chamber 5. The lamp unit 6 is a device for irradiating a visible light to outside of a vehicle. As the lamp unit 6, a headlight unit, vehicle width light unit, direction indicator light unit and fog-light unit, etc. may be mentioned as examples.

The lamp unit 6 is generally arranged at four-corner parts of a vehicle. The four corners are also parts with less obstacles when detecting information of outside of the vehicle. As a result that a LiDAR sensor unit 7 is arranged in a way of sharing a lamp unit 6 and a storage chamber 5, information of outside of the vehicle can be detected effectively.

Note that the LiDAR sensor unit 7 may be replaced by an appropriate sensor unit, which can be used for measuring distance to an object 200 positioned at outside of a vehicle. As such a sensor unit, a ToF camera unit and millimeter wave radar unit may be mentioned as examples. A configuration of using a plurality of kinds of measurement methods may be built in a single sensor unit. A wavelength of a detection light L1 emitted from a light emitting element 71 and a wavelength sensed by a light receiving unit 73 may be decided arbitrarily in accordance with a measurement method to be used.

(Antireflection Film)

An antireflection film 9 is provided on a part or all of a main surface side of the translucent cover 3. The "main surface" includes an outer surface (hereinafter, also simply referred to as "surface") and an inner surface (hereinafter, also simply referred to as "surface"). As it is "on the main surface side", it includes the mode of directly forming the antireflection film 9 at least on one main surface (a front surface, back surface or both of the front and back surfaces) of the translucent cover 3 and the mode of forming it via an optional layer (for example, a primer layer, etc.) between the translucent cover 3 and the antireflection film 9. As it is "on a part or all", it includes the case of forming the antireflection film 9 on a part of a main surface side oof the translucent cover 3. In this case, at least on one main surface side of the translucent cover 3, a mirror finished surface of a plate-shaped base material is exposed.

An antireflection film 9 may be provided also on the end surface (inner end surface, outer end surface or both of the inner and outer end surfaces) side as well as at least one main surface side of the translucent cover 3. FIG. 3 shows the case of forming antireflection films 9a and 9b directly on all surfaces of both main surfaces (front and back surfaces) of the translucent cover 3. An antireflection film 9a is formed allover the back surface (inner surface) 3a of the translucent cover 3 and an antireflection film 9b is formed allover the front surface (outer surface) of the translucent cover 3.

The antireflection films 9 (9a and 9b) serve as below.

When a detection light L1 emitted from the light emitting element 71 passes through the translucent cover 3, a reflection light L3 toward inside arises on the back surface 3a of the translucent cover 3. When the reflection light L3 enters the light receiving element 73 and a light-receiving signal S1 based on the reflection light L3 is output from the light receiving element 73, there is a possibility that the processor 8 recognizes that an object is at a position of the back surface 3a of the translucent cover 3. Also, when a reflection light L2 from the object 200 passes through the translucent cover 3, a reflection light L4 toward outside arises on the back surface 3a of the translucent cover 3. Arising of the reflection light L4 leads to deterioration of a light amount of a reflection light L2 entering to the light receiving element 73.

The antireflection film 9a firstly controls arising of the reflection light L3. Therefore, a possibility that the reflection light L3 enters the light receiving element 73 can be reduced or a light amount of the reflection light L3 entering to the light receiving element 73 can be reduced. Thereby, it is possible to suppress an effect by the reflection light L3 on measuring a distance to the object 200 by the LiDAR sensor unit 7.

Secondary, the antireflection film 9a suppresses arising of a refection light L4. Therefore, it is possible to suppress a decline of a light amount of the reflection light L2 entering to the light receiving element 73, consequently it is possible to suppress a decline of a level of a light-receiving signal S1 related to the object 200.

When a detection light L1 emitted from the light emitting element 71 passes through the translucent cover 3, a reflection light L5 to the inner direction arises at a surface 3b of the translucent cover 3. When the reflection light L5 enters the light receiving element 73 and the light receiving element 73 outputs a light-receiving signal S1 based on the reflection light L5, there is a possibility that the processor 8 recognizes that the object is at a position of the surface 3b of the translucent cover 3. Also, when a reflection light L2 from the object 200 passes through the translucent cover 3, a reflection light L6 to the outer direction arises at the surface 3b of the translucent cover 3. This arising of the reflection light L6 leads to deterioration of a light amount of a reflection light L2 entering to the light receiving element 73.

Firstly, the antireflection film 9b controls arising of a reflection light L5. Therefore, it is possible to reduce the possibility that a reflection light L5 enters the light receiving element 7. Or it is possible to reduce a light amount of a reflection light L5 entering the light receiving element 73. Thereby, it is possible to suppress an effect of a reflection light L5 on measurement of a distance to an object 200 by a LiDAR sensor unit 7.

Secondary, the antireflection film 9b suppresses arising of a reflection light L6. Therefore, it is possible to suppress a decline of a light amount of a reflection light L2 entering to the light receiving element 73. Thereby, it is possible to suppress a decline of a level of a light-receiving signal S1 corresponding to an object 200.

According to a distance measuring device 1 according to one mode of the present invention, an effect of reflections to the inner direction at the back surface 3a and front surface 3b of the translucent cover 3 on distance measurement is suppressed and a decline of an amount of an incident light to the light receiving element 73 by reflections to the outer direction at the back surface 3a and front surface 3b of the translucent cover 3 is suppressed, so that accuracy of detection improves in the distance measuring device 1. In other words, high measurement accuracy can be achieved.

An antireflection film 9 (9a and 9b) in the present example is configured by a membrane formed from a liquid composition.

<Liquid Composition>

A liquid composition according to one mode (hereinafter, also simply referred to as "a composition") is used for forming a membrane on at least one main surface side of a translucent cover 3 (hereinafter, also simply referred to as "an object to be coated") and furthermore on its end surface side and comprises (A) a resin component, (B) unevenness forming particles and (C) a diluent solvent. The (B) used for forming a composition comprises (B1) small particles having a particle diameter ($d_1$) of 0.05 μm or more and 0.4 μm or less and (B2) large particles having a particle diameter ($d_2$) of 2 μm or more and 6 μm or less, and it may also comprise components other than (B1) and (B2). Namely, a composition according to one mode is configured by comprising (A), (B1), (B2) and (C). A composition according to one mode may be used suitably in spray coating when applying to a surface of an object to be coated.

—(A)—

(A) to be used for forming a composition serves as a binder of (B). A material of (A) is not particularly limited and either of a thermoplastic resin and thermosetting resin may be used. As a thermosetting resin, for example, an acrylic-type resin, urethane-type resin, phenol-type resin, melamine-type resin, urea-type resin, diallyl phthalate-type resin, unsaturated polyester-type resin, epoxy-type resin and alkyd-type resin, etc. may be mentioned. As a thermoplastic resin, a polyacrylic ester resin, polyvinyl chloride resin, butyral resin and styrene-butadiene copolymer resin, etc. may be mentioned. In terms of heat resistance, moisture resistance, solvent resistance and surface hardness of an uneven membrane to be formed, a thermosetting resin is preferably used as (A). As a thermosetting resin, when considering flexibility and strength of a membrane to be formed, an acrylic resin is particularly preferable. As (A), one kind may be used alone or two or more kinds may be combined for use.

A content (a total amount) of (A) is not particularly limited, however, when considering a blending balance with other components, it is preferably 5% by mass or more, more preferably 15% by mass or more, furthermore preferably 25% by mass or more and preferably 50% by mass or less, more preferably 45% by mass or less and furthermore preferably 40% by mass or less with respect to a total amount (100% by mass) of total solid content in the composition.

—(B)—

It is essential that the (B) to be used for forming a composition comprises a plurality of unevenness forming particles having different sizes in combination. Particularly, (B1) small particles and (B2) large particles are combined to be used as (B). For example, in the case of composing (B) only of two kinds of unevenness forming particles having different sizes (namely, (B1) and (B2)), a particle diameter ($d_2$) of (B2) is preferably 10 times or more, more preferably 15 times or more a particle diameter ($d_1$) of (B1) and preferably 40 times or less and more preferably 35 times or less. When using as (B) three or more kinds of unevenness forming particles having different sizes, a particle diameter ($d_{max}$) of unevenness forming particles with a maximum particle diameter and a particle diameter ($d_{min}$) of unevenness forming particles with a minimum particle diameter may be adjusted to have the relationship above (namely, ($d_{max}$) is preferably 10 times or more, more preferably 15 times or more the size of ($d_{min}$) and preferably 40 times or less and more preferably 35 times or less the size of ($d_{min}$)).

In one mode, ($d_1$) is preferably 0.05 μm or more, more preferably 0.1 μm or more and preferably 0.4 μm or less and more preferably 0.3 μm or less. ($d_2$) is preferably 2 μm or more, more preferably 3 μm or more and preferably 6 μm or less, more preferably 5 μm or less and furthermore preferably 4 μm or less.

A particle diameter ($d_1$) of (B1) and a particle diameter ($d_2$) of (B2) are a median diameter based on volume measured by a laser diffraction/scattering particle size distribution measuring apparatus.

In one mode, a mass ratio of (B2) in (B) is, with respect to (B1):1, preferably exceeding 1.62, more preferably 1.8 or more and preferably less than 3.58 and more preferably 3.3 or less. The present inventors found that by using (B1) and (B2) having the specific ranges of particle diameters as explained above combined in a range of this mass ratio, one particle (B1) is easily buried between adjacent two particles (B2) in a membrane to be formed. As a result, low glossiness and low reflectivity on the membrane surface can be realized.

A total content (total amount) of (B1) and (B2) in (B) is preferably 90% by mass or more and more preferably 95% by mass or more. An upper limit thereof is not particularly limited and is 100% by mass. Namely, in one mode, (B1) and (B2) may be contained preferably 90% by mass or more in 100% by mass of (B).

A content (total amount) of (B) with respect to a total amount (100% by mass) of a total solid content in the composition is preferably 20% by mass or more, more preferably 25% by mass or more, furthermore preferably 30% by mass or more and preferably 60% by mass or less, more preferably 50% by mass, furthermore preferably 45% by mass or less and particularly preferably 40% by mass or less. When a total amount of (B) is less than 20% by mass, disadvantages of an increase of glossiness and optical density shortage are caused, while when exceeding 60% by mass, (A) in a formed coating film is decreased relatively, which results in a disadvantage that a coating film falls off from an object to be coated.

As (B2), either of resin-type particles and inorganic-type particles may be used. As resin-type particles, for example, a melamine resin, benzoguanamine resin, benzoguanamine/melamine/formalin condensate, acrylic resin, urethane resin, styrene resin, fluoric resin and silicon resin, etc. may be mentioned. As inorganic-type particles, silica, alumina, calcium carbonate, barium sulfate, titan oxide and carbon, etc. may be mentioned. They may be used alone or in combination of two or more kinds.

To obtain more excellent characteristics, it is preferable to use inorganic-type particles as (B2). By using inorganic-type particles as (B2), a lower glossy and high light-shielding membrane can be formed easily. As inorganic-type particles to be used as (B2), silica is preferable. A shape of (B2) is not particularly limited but it is preferable to use particles having a narrow particle distribution having a CV (Coefficient of Variation) value of, for example, 15 or less (a sharp product) to realize lower glossiness, lower reflectiveness and a lower L value on a membrane surface to be formed. The CV value is a numerically expressed degree of spread of a particle diameter distribution (variation of particle diameters) with respect to an average value of a particle diameter (calculated average particle diameter). When using a particle as above, a chance of contacting between (B2) and (B1) increases in a membrane to be formed so as to realize furthermore lower glossiness, lower reflectiveness and a lower L value on the membrane surface.

Also, in order to decrease glossiness on the membrane surface to be formed, a particle in indefinite form as (B2) is preferably used. It is particularly preferable to use a porous indefinite-shaped silica particle as (B2). When using particles as above as (B2), lights refract repeatedly inside and surface when formed into a membrane, consequently, a glossiness on the membrane surface can be furthermore reduced.

In one mode, in order to suppress reflection of lights on a surface of a membrane to be formed, (B2) may be colored black by using an organic-type or inorganic-type colorant. As a material therefor, composite silica, conductive silica and black silica, etc. may be mentioned.

As composite silica, for example, what obtained by synthesizing carbon black (hereinafter, also simply referred to as "CB") and silica at a nano level and composing may be mentioned. As conductive silica, for example, what obtained by coating silica particles with conductive particles, such as CB, may be mentioned. As black silica, for example, natural ore containing graphite in silica may be mentioned.

As well as (B2), material of (B1) is not particularly limited and either of resin-type particles and inorganic-type particles may be used. As resin-type particles, for example, a melamine resin, benzoguanamine resin, benzoguanamine/melamine/formalin condensate, acrylic resin, urethane resin, styrene resin, fluoric resin and silicon resin, etc. may be mentioned. As inorganic-type particles, silica, alumina, calcium carbonate, barium sulfate, titan oxide and CB, etc. may be mentioned. They may be used alone or in combination of two or more kinds.

As (B1), for example, CB, etc. added as a colorant/conductive agent may be also used. When using CB as (B1), a membrane to be formed is colored, so that an effect of preventing reflection is increased furthermore and a preferable antistatic effect can be obtained.

—(C)—

The (C) used for forming a composition is contained for the purpose of dissolving (A) and adjusting viscosity of the whole composition. When using (C), (A) and other component to be added as needed can be mixed more easily and uniformity of the composition is improved. Also, viscosity of the composition can be adjusted properly, so that, when forming a membrane on a surface of an object to be coated, operability of the composition and uniformity of an application thickness can be improved.

As (C), it is not particularly limited as long as it is a solvent capable of dissolving (A), and an organic solvent or water may be mentioned. As an organic solvent, for example, methylethylketone, toluene, propylene glycol monomethyl ether acetate, ethyl acetate, butyl acetate, methanol, ethanol, isopropyl alcohol and butanol, etc. may be used. They may be used alone or in combination of two or more kinds.

A content (total amount) of (C) in a composition is, with respect to 100 parts by mass of (A), preferably 1 part by mass or more, more preferably 3 parts by mass or more and preferably 20 parts by mass or less in order to obtain the effects of containing (C) as explained above.

—(D) Optional Component—

Other than the components ((A), (B) and (C)) above, the composition may contain (D) to an extent of not hindering the effects of the present invention. As (D), for example, a leveling agent, thickener, pH adjusting agent, lubricant, dispersant, defoaming agent, curing agent and reaction catalyst, etc. may be mentioned.

Particularly when using a thermosetting resin as (A), crosslinking of (A) can be accelerated by blending a curing agent. As a curing agent, a urea compound having a functional group, a melamine compound, isocyanate compound, epoxy compound, aziridine compound and oxazoline compound, etc. may be mentioned. As a curing agent, isocyanate compound is preferable among them. The curing agent may be used alone or in combination of two or more kinds.

A ratio of blending a curing agent in a composition is, with respect to 100 parts by mass of (A), preferably 10 parts by mass or more and 80 parts by mass or less. When adding a curing agent in this range, hardness of a membrane to be formed is enhanced, consequently, characteristics of the membrane surface can be maintained for a long term even when the membrane is exposed to an environment of rubbing against other member, and low glossiness, a high light-shielding characteristic, low reflectiveness and a high degree of blackness can be maintained easily.

When a curing agent is contained in a composition, a reaction catalyst may be used together so as to accelerate reaction of the curing agent with (A). As a reaction catalyst, for example, ammonia and aluminum chloride, etc. may be mentioned. A ratio of a reaction catalyst to be contained in the composition is, with respect to 100 parts by mass of a curing agent, preferably 0.1 part by mass or more and 10 parts by mass or less.

A composition according to one mode has viscosity at 25° C. of preferably 1 mPa·s or more, preferably 30 mPa·s or less and more preferably 20 mPa·s or less for the reason of coating by using a spray (spray coating) while maintaining smoothness of the composition on a surface of an object to be coated. When viscosity of the composition is too low, there is a possibility in some cases that a membrane having a thickness enough to exhibit sufficient suppression of reflection lights L3, L4, L5 and L6 so as not to arise. When viscosity of the composition is too high, it becomes difficult to spray the composition uniformly on a surface of an object to be coated, so that there is a possibility that a membrane having a uniform thickness with little performance variation cannot be obtained.

The viscosity above differs depending on components contained in the composition, that is, kinds and molecular weights, etc. of (A) and (B) to be used. Also, when blending (D) in addition to the (A) and (B) above, it differs depending on a kind and molecular weight, etc. of (D). However, it can be adjusted easily by adjusting an amount of (C) in the composition in the range stated above.

A composition according to one mode of the present invention may be prepared (produced) by adding (A), (B) and, when needed, (D) to (C), and mixing and agitating. An order of mixing the respective components is not particularly limited as long as the components are mixed uniformly.

A composition according to one mode of the present invention may be one-liquid type or two-liquid type. When containing a curing agent as (D) in the composition, the composition according to one mode may be two-liquid type with, for example, a first liquid comprising components other than a curing agent and a second liquid comprising a curing agent.

A method of forming a membrane is not particularly limited. A membrane may be formed on an object to be coated by any method or by an apparatus, for example, spray coating (for example, air spray, airless spray and electrostatic spray, etc.), paint brush, curtain flow coating, roller brush coating, bar coating, kiss roll, metaling bar, gravure roll, reverse roll, dip coating and die coating may be used.

Particularly, a composition according to one mode preferably forms a membrane by using spray coating, which requires spray of droplets from a small spray hole. In other words, a membrane according to one mode is formed from a liquid composition and a membrane to be formed is a spray coated membrane.

According to spray coating using a composition according to one mode, droplets of the composition adhere successively to a surface of an object to be coated and, at the same time, volatilization of (C) in the droplets adhered to the object to be coated proceeds. As a result, a solid content (particles) obtained by removing (C) from droplets laminates successively on the surface of the object to be coated so as to form a solid particle laminate. According to one mode, this solid particle laminate configures a membrane.

In the case of using a composition comprising a thermosetting resin as (A) and furthermore comprising a curable agent as (D), it is preferable that after a solid particle laminate is applied to a surface of an object to be coated, the laminate is heated to be cured. Here, even if a trace of (C) remains in the preheated laminate, it volatilizes almost completely by the heating.

Heating condition may be adjusted properly depending on a thickness of the preheat laminate, heat resistant characteristic of an object to be coated, and a kind of (C) to be used, etc. The heating condition is, for example, at 70° C. or more and 150° C. or less for one minute or more and 10 minutes or less, and preferably at 100° C. or more and 130° C. or less for 2 minutes or more and 5 minutes or less.

A thickness of antireflection films 9a and 9b is not particularly limited as long as their strength in adhesiveness to a translucent cover 3 is preferable and arising of reflection lights on surfaces, on which the films are formed, can be suppressed. To raise an example of a preferable film thickness, it is preferably 2 μm or more, more preferably 5 μm or more and preferably 40 μm or less and more preferably 25 μm or less.

Note that a thickness of the antireflection films 9a and 9b is a height including parts protruding, due to (B2) and (B1) in the membrane, from a surface of an object to be coated. The film thickness can be measured by a method based on JIS K7130.

<Characteristics of Membrane>

Characteristics of a membrane formed from a composition according to one mode are as below.

(Glossiness, Reflectance, Optical Density, L Value and Adhesiveness)

A membrane formed from a composition according to one mode preferably has 85°-glossiness of less than 4%, reflectance of 6% or less and an optical density of 1.5 or more.

Here, when configured that a membrane formed from a composition according to one mode is exposed as an outermost surface, 85°-glossiness, reflectance and optical density on a real surface of the membrane are preferably in the ranges as above. When another membrane is coated on a membrane formed from a composition according to one mode, 85°-glossiness, reflectance and optical density on a surface of this another membrane (that is, an outermost surface of the translucent cover 3) are preferably in the ranges as above. Hereinafter, these surfaces will be referred to as "an outermost surface of a membrane".

An outermost surface of a membrane formed from a composition according to one mode preferably has 85°-glossiness of less than 4%, reflectance 6% or less and an optical density 1.5 or more. When 85°-glossiness, reflectance and optical density on an outermost surface of a membrane are in the ranges as above, it is possible to attain low glossiness, low reflectance (an excellent antireflection property: It will be the same hereinafter.) and a high light-shielding characteristic on the outermost surface of the membrane.

The uppermost value of 85°-glossiness is more preferably less than 3.5% and furthermore preferably less than 2.5%. When 85°-glossiness is adjusted to be in the range above, an advantage of suppressing light reflection can be obtained easily. A lower limit value of 85°-glossiness is not particularly limited, and the lower the better.

An uppermost value of reflectance is more preferably 3% or less and furthermore preferably 2.5% or less. A lower limit value of reflectance is not particularly limited. The lower the reflectance is, the better. When reflectance is adjusted to be in the range above, an advantage of preventing malfunctions of a sensor can be obtained.

A lower limit value of an optical density is more preferably 1.8 or more and furthermore preferably 2.0 or more. When an optical density is adjusted to be in the range above, a light-shielding characteristic can be improved furthermore. An upper limit value of an optical density is not particularly limited. The higher, the better. For example, it is less than 3.0.

In addition to the above, a membrane to be formed from a composition according to one mode preferably has an L value of 22 or less on the outermost surface thereof. An uppermost value of an L value (a blackness degree) is more preferably 20 or less and furthermore preferably 18 or less. The lowermost value thereof is not particularly limited.

The L value above is a lightness L*value on an outermost surface of a membrane, which is in CIE 1976 L*a*b* (CIELAB) color space system based on a SCE method. The SCE method is a specularly reflected light removal method, which means a method of measuring color by removing specularly reflected lights. Definition of the SCE method is defined in JIS Z8722 (2009). Since specularly reflected lights are removed in the SCE method, the color is close to the color actually viewed by human.

CIE is abbreviation of Commission Internationale de l'Eclairage, which means international committee on illumination. The CIELAB color space was adopted in 1976 in order to measure color difference between perception and devices and is a uniform color space defined in JIS Z 8781 (2013). Three coordinates in CIELAB are indicated by L*value, a*value and b*value. The L*value indicates lightness and expressed from 0 to 100. When L*value is 0, it indicates black, while it indicates white diffusion color when L*value is 100. The a*value indicates colors between red and green. When a*value is in minus, it indicates colors close to green, while when in plus, it indicates colors close to red. The b*value indicates colors between yellow and blue. When b*value is in minus, it indicates colors close to blue, while it indicates colors close to yellow when in plus.

The glossiness, reflectance, an optical density and L value explained above can be measured by methods explained later on.

In addition to the characteristics (glossiness, reflectance, an optical density and L value) above, the membrane preferably has good adhesiveness to a surface of an object to be coated. Adhesiveness of a membrane formed from a composition to a surface of an object to be coated is, as explained in adhesiveness evaluation in later-explained examples, that preferably 75% or more of the coating remain.

(Rz, Rsm, Rsk, Rku and Ra)

In a membrane formed from a composition according to one mode, it is preferable that a maximum height Rz is 7 μm or more, an average length Rsm of contour curve element is 80 μm or more, skewness Rsk of contour curve is 0.3 or less and Kurtosis Rku of a contour curve is 3 or more on its outermost surface of the membrane. When Rz, Rsm, Rsk and Rku on the outermost surface of the membrane are in the ranges above, glossiness, reflectance and an optical density on the outermost surface of a membrane can become in the ranges above (85°-glossiness of less than 4%, reflectance 6% or less and an optical density 1.5 or more), consequently, low glossiness, low reflectance and a high light-shielding characteristic on the outermost surface of a membrane can be attained.

The lower limit value of Rz is more preferably 10 μm or more. When the lower limit value of Rz is as above, low glossiness, low reflectance and high light-shielding characteristic can be adjusted furthermore easily.

An upper limit value of Rz is not particularly limited but is preferably 50 m or less and more preferably 30 μm or less. When an upper limit value of Rz is as above, furthermore lower glossiness, lower reflectance and a higher light-shielding characteristic on the outermost surface of a membrane can be attained easily.

The Rsm indicates an average length of contour curve elements within the standard length. A lower limit value of Rsm is more preferably 100 μm or more and furthermore preferably 120 μm or more. When a lower limit value of Rsm is as above, an advantage of low glossiness can be attained furthermore easily. An upper limit value of Rsm is not particularly limited, but preferably 160 μm or less. In this range, furthermore excellent adhesiveness between an object to be coated and a membrane to be formed thereon can be obtained.

The Rsk is an average of the cubes of a height $Z(x)$ in a dimentionless reference length obtained by a root mean square height $(Zq)$ cubed, which is an index indicating deviation from an average line of uneven shape, that is, a degree of strain, on an outermost surface of a membrane. There is a tendency that when Rsk value is in plus (Rsk>0), the uneven shape is deviated to the concave side, so that protruding shape becomes sharp. On the other hand, when in minus (Rsk<0), the uneven shape is deviated to the convex side, so that protruding shape becomes dull. When the protruding shape of contour curve is dull, haze becomes low comparing with the case with a sharp shape.

An upper limit value of Rsk is more preferably 0.2 or less. When an upper limit value of Rsk is as above, an advantage of low glossiness can be obtained furthermore easily. A lower limit value of Rsk is not particularly limited but is preferably 0 or more. When a lower limit value of Rsk is as above, an advantage of low glossiness can be obtained easily.

The Rku indicates an average of the fourth-power of a height $Z(x)$ in a dimentionless reference length obtained by the four-power of a root-mean-square height $(Zq)$, and is an index indicating a degree of sharpness at tips of unevenness on an outermost surface of a membrane. When Rku is larger, there are more sharp tips on unevenness, so that an inclined angle close to tips of unevenness becomes larger while inclined angles of other parts become smaller, so that there is a tendency that a disadvantage that strength of the tips declines and the coated membrane falls off. On the other hand, as Rku becomes smaller, many tips of unevenness become flat, so that an inclined angle of tips of unevenness becomes small and there is a tendency that a disadvantage of an increase of 85°-glossiness arises easily.

A lower limit value of Rku is more preferably 3.3 or more. When a lower limit value of Rku is as above, an advantage of low glossiness can be obtained more easily. An upper limit value of Rku is not particularly limited, but is preferably 5 or less. When an upper limit value of Rku is as above, an advantage of low glossiness can be obtained more easily.

In a membrane formed from a composition according to one mode, an arithmetic average roughness (Ra) on an outermost surface is preferably 0.5 μm or more, more preferably 1.0 μm or more and furthermore preferably 1.5 μm or more.

Those Rz, Rsm, Rsk, Rku and Ra on an outermost surface of a membrane as explained above can be measured or calculated based on JIS B0601:2001.

(Other Modes)

An antireflection film 9 according to one mode explained above may be formed directly on at least one main surface side of a translucent cover 3 without any pretreatment or may be formed via a primer layer, however, it is not limited to the modes. For example, it may be a mode of preparing a sheet of an antireflection film obtained by forming an antireflection film 9 by spray coating on an extremely thin plastic film (PET film, etc.), cutting the sheet to fit a shape of at least one main surface side of the translucent cover 3 so as to obtain a sheet piece, then, applying the sheet piece to the at least one main surface side of the translucent cover 3 via an adhesive layer and, finally, forming an antireflection film 9.

An antireflection film 9 according to one mode above is not limited to the case of forming on the translucent cover 3 and it may be formed on other components (for example, an exterior member 2 and an inner wall of a housing 75 in a LiDAR sensor unit 7) of the distance measuring device 1. A material of other components able to be formed with an antireflection film 9 is not limited to glass and a resin and may be metal (for example, SUS and aluminum, etc.).

(Application Example)

Other than four-wheel drive vehicles (automobiles, electric cars and hybrid electric cars, etc.), a distance measuring device 1 according to one mode explained above may be implemented as a device to be mounted on other mobile body, such as other vehicles (motorcycles, bicycles and personal mobilities, etc.), airplanes (including drones), ships and robots.

A distance measuring device 1 according to one mode explained above may be also mounted on a variety of electronic apparatuses, such as smartphones, tablet type terminal, cellular phones, personal computers, game devices, television receivers, wearable terminals, digital still cameras, digital video cameras. Below, a case of mounting on a smartphone will be explained as an example.

Figure 4:
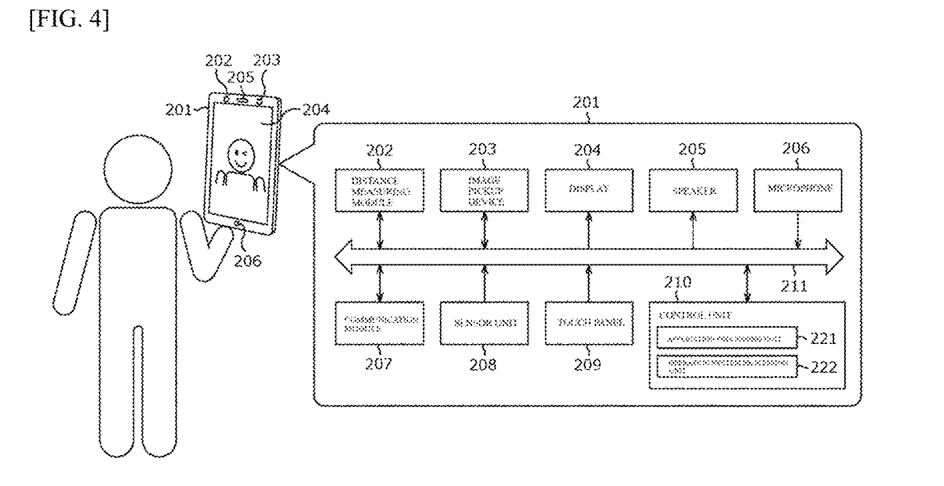
FIG. 4 is a block diagram showing a configuration example of an electronic apparatus according to one mode of the present invention.

As shown in FIG. 4, a smartphone 201 comprises a distance measuring module 202, image pickup device 203, display 204, speaker 205, microphone 206, communication module 207, sensor unit 208, touch panel 209 and a control unit 210 and is configured by connecting them via a bus 211. The control unit 210 has functions as an application processing unit 221 and an operation system processing unit 222 as a result that a CPU executes programs.

A LiDAR sensor unit 7 shown in FIG. 2 and FIG. 3 is applied to the distance measuring module 202. For example, the distance measuring module 202 is arranged on a front surface of the smartphone 201, is capable of performing measurement of a distance to a user of the smartphone 201 and outputting various information as a result of distance measurement. A processor 8 in FIG. 3 corresponds to the control unit 210 in FIG. 4.

An image pickup device 203 is arranged on a front surface of the smartphone 201 and picks up an image of a user of the smartphone 201 as a subject so as to obtain an image of the user. Note that it may be configured (not illustrated) to arrange an image pickup device 203 also on a back surface of the smartphone, as well.

A display 204 displays an operation screen for performing processing by an application processing unit 221 and an operation system processing unit 222 and displays an image, etc. obtained by an image pickup device 203. A speaker 205 and microphone 206 outputs voice and sound of a counterpart and picks up voice and sound of a user, for example, when talking on the smartphone 201.

A communication module 207 performs communication via a communication network. A sensor unit 208 senses speed, accelerating rate and proximity, etc. and a touch panel 209 obtains a toughing operation by a user on an operation screen displayed on the display 204.

An application processing unit 221 performs processing so as to provide a variety of services through the smartphone 201. For example, an application processing unit 221 may perform processing of creating a face by virtually reproducing a face expression of the user by computer graphics based on information supplied from a distance measuring module 202 and displaying on the display 204. Also, the application processing unit 221 may perform processing of creating three-dimensional shape data of a three-dimensional object based on information supplied from the distance measuring module 202.

An operation system processing unit 222 performs processing for realizing basic functions and operations of the smartphone 201. For example, the operation system processing unit 222 may perform processing of recognizing a face of the user based on information supplied from the distance measuring module 202 to unlock the smartphone 201. The operation system processing unit 222 may perform processing of, for example, recognizing a gesture of the user based on information supplied from the distance measuring module 202 and inputting a variety of operations according to the gesture.

EXAMPLES

Below, the present invention will be explained specifically based on examples (including modes and comparative examples), however, the present invention is not limited to the examples. Below, "part" indicates "part by mass" and "%" indicates "% by mass".

[Components of Composition]

As A (a resin component), a substance below was prepared.
 A1: thermosetting acrylic resin
 (ACRYDIC A-801 PRODUCED BY DIC, solid content 50%)

As B1 (small particles) falling under B (unevenness forming particles), substances below were prepared.
 B1a: carbon black (CB) (particle diameter 150 nm)
 (MHI Black_#273 produced by MIKUNI Color Ltd., CB content 9.5%)
 B1b: transparent silica (particle diameter 58 nm)
 (ACEMATT R972 produced by EVONIK)

As B2 (large particles) falling under B, substances below were prepared.
 B2a: composite silica (particle diameter 3 μm)
 (BECSIA ID produced by Fuji Silysia Chemical Ltd.)
 B2b: black acrylic beads (particle diameter 3 μm)
 (RUBCOULEUR 224SMD black produced by Dainichiseika Color & Chemicals Mfg Co., Ltd.)
 B2c: transparent silica (particle diameter 4.1 μm)
 (SYLYSIA 430 produced by Fuji Silysia Chemical Ltd.)
 B2d: transparent silica (particle diameter 8 μm)
 (SYLYSIA 450 produced by Fuji Silysia Chemical Ltd.)
 B2e: transparent acrylic beads (particle diameter 3 μm)
 (ENEOS Uni-Powder NMB-0320C produced by ENEOS Corporation)

Note that BECSIA ID used as B2a (composite silica) is composite particles of CB and silica, wherein CB/silica=about 25/75 (mass ratio). The MHI black_#273 used as B1a (CB) is a CB dispersant and, in a solid content total amount 18% of the dispersant, 9.5% is CB and remaining 8.5% is other compounds. In the 8.5% of remaining compounds, 3% is a copper compound and 5.5% is an acrylic resin.

As D (optional component), a substance below was prepared.
 D1: isocyanate compound
 (TAKENATE D110N produced by Mitsui Chemicals, Inc., solid content 75%)

[Object to be Coated]

As an object to be coated, sample substrates for evaluation were prepared. as a sample substrate for evaluation, a black polycarbonate sheet material was used and rectangular-shaped polycarbonate plates (100 mm in the longitudinal length, 50 mm in width and 1.5 mm in thickness) produced to be matte finish on both surfaces of the plate in the thickness (X) direction were prepared.

Examples 1 to 17

1. Preparation of Composition

Respective components for each example with each solid content ratio shown in Table 1 were prepared, so that a total solid content becomes approximately 25% by mass, and added to a necessary amount of (C) a diluent solvent, which is a mixed solvent (methylethyl ketone: butyl acetate=50:50), and agitated to mix, and a liquid composition (hereinafter, also simply referred to as "a liquid") was prepared.

2. Production of Sample for Evaluation

Each liquid obtained for each of the examples was sprayed toward an outer surface of an object to be coated by spray coating in the same method as explained in (3-1) Coating Performance below. Then, the resultant was heated at 120° C. for 3 minutes to dry, a solid particle laminate was formed by spray coating and heated to be a coating (hereinafter, also simply referred to as "a coating") having an average membrane thickness of 20 μm on a surface of the object to be coated, so that a sample for evaluation was obtained.

3. Evaluation

On each liquid obtained in each of the examples, a variety of characteristics (coating performance) were evaluated in the methods explained below (liquid evaluation). Also, a coating formed on each sample for evaluation obtained in each of the examples was evaluated on a variety of characteristics (characteristics and surface properties) (sample evaluation). The results are shown in Table 1.

[Liquid Evaluation]

(3-1) Coating Performance

Coating performance of a liquid was evaluated by observing coating uniformity after spray coating.

An air spray configured by attaching an air brush (Spray-Work HG Single Airbrush produced by TAMIYA, Inc.) to an air can (Spray-Work Air Can 420D produced by TAMIYA, Inc.) was prepared and each liquid was poured into it. Then, the liquid was sprayed toward an outer surface of an object to be coated for 10 seconds from a 10 cm distance from a tip of the air brush, and a formed solid particle laminate was evaluated its coating uniformity visually. Evaluation reference is as below.

○: Lack of coating uniformity (lack of uniformity in thickness) was not observed.

Δ: Lack of coating uniformity was observed partially.

X: Lack of coating uniformity was observed in many areas.

[Sample Evaluation]

(3-2) Characteristics

—Glossiness—

Glossiness against a measurement light having an incident angle of 85° (specular glossiness at 85°) on a surface of a coating formed on each sample for evaluation was measured on 9 spots by using a glossmeter (VG 7000 produced by NIPPON DENSHOKU Industries Co., Ltd.) by the method based on JIS Z8741, and an average value thereof was adopted as a glossiness degree. Evaluation reference is as below.

(85°-Specular Glossiness)

◎: less than 3.5% (very excellent)

○: 3.5% or more but less than 4% (excellent)

X: 4% or more (insufficient)

—Reflectance—

Reflectance against a light having a wavelength of 905 nm on a surface of a coating formed on each sample for evaluation was measured at 9 spots at an interval of 1 nm by using a spectral colorimeter (CM-5 produced by Konica Minolta Inc.) by the method based on JIS Z8722, and an average value thereof was adopted as reflectance. Evaluation reference is as below.

◎: Reflectance was 3% or less. (extremely preferable low reflectance)

○: Reflectance exceeded 3% but 6% or less. (preferable low reflectance)

X: Reflectance exceeded 6%. (not low enough reflectance)

—Light-Shielding Characteristic—

A light-shielding characteristic of a coating formed on each sample for evaluation was evaluated by calculating an optical density of the coating. An optical density of a coating formed on each sample for evaluation was obtained by using an optical density meter (X-rite 361T (ortho filter) produced by Nihon Heihan Kizai Kabushiki Kaisha), irradiating a vertical transmission light flux to the coated film side of a sample and calculating by expressing a ratio with respect to a state without a coating film in log (logarithms). An optical density of 6.0 or more is an upper limit value of detection in the measurement. Evaluation reference is as below.

◎: An optical density was 1.8 or more. (extremely preferable light-shielding characteristic)

○: An optical density was 1.5 or more but less than 1.8. (preferable light-shielding characteristic)

X: Optical density was less than 1.5. (insufficient light-shielding characteristic)

—Adhesiveness—

Adhesiveness of a coating film formed on each sample for evaluation to a surface of an object to be coated was evaluated by cutting the coating film in a grid pattern with a market-available cutter, putting thereon a cellophane tape (Cellulose tape produced by NICHIBAN Co., Ltd.), then taking off the tape, and visually observing a remaining state of the coating film. Evaluation reference is as below.

◎: A coating film remained 100%. (extremely high adhesiveness)

○: A coating film remained 75% or more and less than 100%. (high adhesiveness)

X: A coating film remained less than 75%. (insufficient adhesiveness)

—Comprehensive Evaluation—

Glossiness, reflectance, a light-shielding characteristic and adhesiveness as above were evaluated comprehensively. Evaluation reference is as below.

◎: Evaluations on glossiness, reflectance, a light-shielding characteristic and adhesiveness were all ◎.

○: At least one of the evaluations on glossiness, reflectance, a light-shielding characteristic and adhesiveness was ○, and there was no X.

X: At least one of the evaluations on glossiness, reflectance, a light-shielding characteristic and adhesiveness was X.

(3-3) Surface Properties

—Rz Value, Rsm Value, Rsk Value, Rku Value and Ra Value—

Properties (Rz value, Rsm value, Rsk value, Rku value and Ra value) of a surface of a coating film formed on each sample for evaluation were measured by using a surface roughness measuring device (SURFCOM 480B produced by TOKYO SEIMITSU Co., Ltd.) by a method based on JIS B0601:2001. Evaluation references are as below.

(Rz)

◎: Rz was 10 μm or more. (extremely preferable)

○: Rz was 7 μm or more but less than 10 μm. (preferable)

X: Rz was less than 7 μm. (defective)

(Rsm)

◎: Rsm was 120 μm or more. (extremely preferable)

○: Rsm was 80 μm or more but less than 120 μm. (preferable)

X: Rsm was less than 80 μm. (defective)

(Rsk)

◎: Rsk was 0.2 or less. (extremely preferable)

○: Rks exceeded 0.2 but 0.3 or less. (preferable)

X: Rsk exceeded 0.3. (defective)

(Rku)

◎: Rku was 3.3 or more. (extremely preferable)

○: Rku was 3 or more but less than 3.3. (preferable)

X: Rku was less than 3. (defective)

(Ra)

◎: Ra was 1.5 μm or more. (extremely preferable)

○: Ra was 0.5 μm or more but less than 1.5 μm. (preferable)

X: Ra was less than 0.5 μm. (defective)

TABLE 1

| | COMPONENTS | | | | EXAMPLES | | | | | | | | |
|---|---|---|---|---|---|---|---|---|---|---|---|---|---|
| | | | | | 1 | 2 | 3 | 4 | 5 | 6 | 7 | 8 | 9 |
| LIQUID COMPOSITION | A | A1 | | ACRYLIC RESIN | 60 | 60 | 60 | 60 | 60 | 60 | 60 | 60 | 60 |
| | D | D1 | | ISOCYANATE COMPOUND | 40 | 40 | 40 | 40 | 40 | 40 | 40 | 40 | 40 |
| | B | B1 | B1a | CARBON BLACK (150 nm) | 21.0 | 19.0 | 15.0 | 13.0 | 12.0 | 15.0 | 15.0 | 15.0 | 15.0 |
| | | | B1b | TRANSPARENT SILICA (58 nm) | — | — | — | — | — | — | — | — | — |
| | | B2 | B2a | TRANSPARENT SILICA (3 μm) | 34.0 | 36.0 | 40.0 | 42.0 | 43.0 | — | — | — | — |
| | | | B2b | BLACK ACRYLIC BEADS (3 μm) | — | — | — | — | — | 40.0 | — | — | — |
| | | | B2c | TRANSPARENT SILICA (4.1 μm) | — | — | — | — | — | — | — | 40.0 | — |
| | | | B2d | TRANSPARENT SILICA (8 μm) | — | — | — | — | — | — | — | — | 40.0 |
| | | | B2e | TRANSPARENT ACRYLIC BEADS (3 μm) | — | — | — | — | — | — | 40.0 | — | — |
| | | | | ※B1:B2 = 1:● (MASS RATIO) | 1.62 | 1.89 | 2.67 | 3.23 | 3.58 | 2.67 | 2.67 | 2.67 | 2.67 |
| | | | | ※(A + B + D):B = 100:● (MASS RATIO) | 35.5 | 35.5 | 35.5 | 35.5 | 35.5 | 35.5 | 35.5 | 35.5 | 35.5 |
| EVALUATION ON CHARACTERISTICS | LIQUID | | | COATING PERFORMANCE | ○ | ○ | ○ | ○ | ○ | ○ | ○ | ○ | ○ |
| | MEMBRANE CHARACTERISTICS | | | GLOSSINESS (85°-SPECULAR GLOSSINESS) | X | ○ | ◎ | ◎ | ◎ | X | ○ | ◎ | ◎ |
| | | | | REFLECTANCE (ANTIREFLECTION CHARACTERISTIC) | ○ | ○ | ◎ | ◎ | ◎ | ○ | ○ | ○ | ○ |
| | | | | LIGHT-SHIELDING CHARACTERISTIC | ◎ | ◎ | ◎ | ○ | X | ○ | X | ○ | X |
| | | | | ADHESIVENESS | ◎ | ◎ | ◎ | ○ | X | ◎ | ◎ | ◎ | X |
| | | | | ※COMPREHENSIVE EVALUATION ON MEMBRANE CHARACTERISTICS | X | ○ | ◎ | ○ | X | X | X | ○ | X |
| | MEMBRANE PROPERTIES | | | Rz | X | ○ | ◎ | ○ | ○ | ○ | ○ | ○ | ○ |
| | | | | Rsm | ○ | ○ | ◎ | ○ | ○ | ○ | ○ | ○ | ○ |
| | | | | Rsk | X | ○ | ◎ | ○ | ○ | ○ | ○ | ○ | ○ |
| | | | | Rku | ◎ | ◎ | ◎ | ○ | ○ | ○ | ○ | ○ | ○ |
| | | | | Ra | ○ | ○ | ◎ | ◎ | ○ | ○ | ○ | ○ | ○ |

| | COMPONENTS | | | | EXAMPLES | | | | | | | | |
|---|---|---|---|---|---|---|---|---|---|---|---|---|---|
| | | | | | 10 | 11 | 12 | 13 | 14 | 3 | 15 | 16 | 17 |
| LIQUID COMPOSITION | A | A1 | | ACRYLIC RESIN | 60 | 60 | 60 | 60 | 60 | 60 | 60 | 60 | 60 |
| | D | D1 | | ISOCYANATE COMPOUND | 40 | 40 | 40 | 40 | 40 | 40 | 40 | 40 | 40 |
| | B | B1 | B1a | CARBON BLACK (150 nm) | — | 15.0 | — | 5.0 | 10.0 | 15.0 | 25.0 | 35.0 | 45.0 |
| | | | B1b | TRANSPARENT SILICA (58 nm) | 15.0 | 40.0 | 15.0 | — | — | — | — | — | — |
| | | B2 | B2a | TRANSPARENT SILICA (3 μm) | 40.0 | — | — | 16.0 | 19.0 | 40.0 | 62.0 | 80.0 | 120.0 |
| | | | B2b | BLACK ACRYLIC BEADS (3 μm) | — | — | 40.0 | — | — | — | — | — | — |
| | | | B2c | TRANSPARENT SILICA (4.1 μm) | — | — | — | — | — | — | — | — | — |
| | | | B2d | TRANSPARENT SILICA (8 μm) | — | — | — | — | — | — | — | — | — |
| | | | B2e | TRANSPARENT ACRYLIC BEADS (3 μm) | — | — | — | — | — | — | — | — | — |
| | | | | ※B1:B2 = 1:● (MASS RATIO) | 2.67 | 2.67 | 2.67 | 3.20 | 1.90 | 2.67 | 2.48 | 2.29 | 2.67 |
| | | | | ※(A + B + D):B = 100:● (MASS RATIO) | 35.5 | 35.5 | 35.5 | 17.4 | 22.5 | 35.5 | 46.5 | 53.5 | 62.3 |
| EVALUATION ON CHARACTERISTICS | LIQUID | | | COATING PERFORMANCE | ○ | ○ | ○ | ○ | ○ | ○ | ○ | ○ | ○ |
| | MEMBRANE CHARACTERISTICS | | | GLOSSINESS (85°-SPECULAR GLOSSINESS) | ○ | X | ○ | X | ○ | ◎ | ◎ | ◎ | ○ |
| | | | | REFLECTANCE (ANTIREFLECTION CHARACTERISTIC) | ○ | X | ○ | X | ○ | ◎ | ○ | ◎ | ○ |
| | | | | LIGHT-SHIELDING CHARACTERISTIC | ○ | ○ | X | X | ○ | ◎ | ◎ | ○ | ○ |
| | | | | ADHESIVENESS | ◎ | X | ○ | ◎ | ◎ | ◎ | ○ | ○ | X |
| | | | | ※COMPREHENSIVE EVALUATION ON MEMBRANE CHARACTERISTICS | ○ | X | X | X | ○ | ◎ | ○ | ○ | X |
| | MEMBRANE PROPERTIES | | | Rz | ○ | X | ○ | X | ○ | ◎ | ◎ | ◎ | ◎ |
| | | | | Rsm | ○ | X | X | X | ○ | ◎ | ◎ | ◎ | ◎ |
| | | | | Rsk | ○ | X | X | X | ○ | ◎ | ◎ | ○ | ○ |
| | | | | Rku | ○ | X | X | X | ○ | ◎ | ◎ | ○ | ○ |
| | | | | Ra | ○ | X | ○ | X | ○ | ◎ | ◎ | ◎ | ◎ |

4. Consideration

As shown in Table 1, when a liquid for forming a membrane did not comprise as (B) one or more of (B1) and (B2) (Examples 6, 7, 9, 11 and 12), at least one of the membrane characteristics of glossiness, reflectance, a light-shielding characteristic and adhesiveness was not satisfied. On the other hand, even both of (B1) and (B2) were contained as (B) in the liquid (Examples 1 to 5, 8 and 10), when a mass ratio of (B2) with respect to (B1):1 was 3.58 or more (Example 5), adhesiveness as membrane characteristics was not satisfied, and when it was 1.62 or less (Example 1), glossiness as membrane characteristics was not satisfied. Even if both of (B1) and (B2) were contained and a mass ratio of (B2) with respect to (B1):1 was in a proper range (exceeding 1.62 and less than 3.58) (Examples 2 to 4 and 13 to 17), when a content (total amount) of (B) in 100% by mass of a total solid content was less than 20% by mass (Example 13) or exceeding 60% by mass (Example 17), one or more of the membrane characteristics of glossiness, reflectance, a light-shielding characteristic and adhesiveness was not satisfied.

On the other hand, when a mass ratio range of (B2) with respect to (B1):1 exceeded 1.62 and less than 3.58 and a total content of (B) with respect to a total solid amount of 100% by mass in a composition was 20% by mass or more and 60% by mass or less (Examples 2 to 4, 8, 10 and 14 to 16), all of the coating performance of the liquid, membrane characteristics and membrane properties were satisfied.

DESCRIPTION OF NUMERICAL NOTATIONS

1 . . . Distance Measuring Device
2 . . . Exterior Member
5 . . . Storage Chamber
   6 . . . Lamp Unit
   7 . . . LiDAR Sensor Unit
      71 . . . Light Emitting Element
      72 . . . Light Receiving Element
      75 . . . Housing
   3 . . . Translucent Cover
      9, 9a, 9b . . . Antireflection Film
   8 . . . Processor (Control Unit)
200 . . . Object (Subject of Measurement)
201 . . . Smartphone (Example of Electronic Apparatus)
   202 . . . Distance Measuring Module (Distance Measuring Device 1)
   203 . . . Image Pickup Device
   204 . . . Display
   205 . . . Speaker
   206 . . . Microphone
   207 . . . Communication Module
   208 . . . Sensor Unit
   209 . . . Touch Panel
   210 . . . Control Unit (Processor 8)
      221 . . . Application Processing Unit
      222 . . . Operation System Processing Unit
   211 . . . Bus

The invention claimed is:

1. A distance measuring device, comprising
a light emitting element for emitting a detection light for measuring a distance to an object;
a light receiving element for outputting a light-receiving signal in accordance with an amount of an incident light; and
a translucent cover for covering the light emitting element and light receiving element,
wherein:
the translucent cover has an antireflection film at least on one main surface side;
the antireflection film is configured by a membrane having a thickness of 2 μm or more and 40 μm or less formed from a liquid composition by spray coating;
the liquid composition comprises at least (A), (B) and (C);
(A) is a resin component;
(B) is inorganic-type particles or a mixture of resin-type particles and inorganic-type particles;
(B) is contained in an amount of 20% by mass or more and 60% by mass or less in a total amount of 100% by mass of all solid content in the liquid composition;
(B) comprises (B1) and (B2), wherein a total amount of (B1) and (B2) in 100% by mass of (B) is 90% by mass or more, and a mass ratio of (B2) with respect to (B1) is 1.8 or more and 3.3 or less;
(B1) is inorganic-type small particles having a particle diameter ($d_1$) of 0.05 μm or more and 0.4 μm or less;
(B2) is inorganic-type large particles having a particle diameter ($d_2$) of 3 μm or more and 6 μm or less;
(B2) comprises silica, the silica comprises complex silica obtained by blackening silica with a colorant; and
(C) is a diluent solvent.

2. The distance measuring device according to claim 1, wherein (B1) comprises carbon black.

3. The distance measuring device according to claim 2, wherein an outermost surface of a plane formed with the membrane has glossiness of less than 4% against an incident light with an incident angle of 85°, reflectance of 6% or less against a light having a wavelength of 905 nm, and an optical density of 1.5 or more.

4. The distance measuring device according to claim 3, wherein, on the outermost surface of the plane formed with the membrane, a maximum height Rz based on JIS B0601: 2001 is 7 μm or more, an average length Rsm of contour curve elements is 80 μm or more, a skewness Rsk of a contour curve is 0.3 or less, and Kurtosis Rku of a contour curve is 3 or more.

5. The distance measuring device according to claim 2, wherein the light emitting element and light receiving element are a part of at least one selected from a group composed of a LIDAR sensor unit, ToF camera unit and a millimeter radar unit.

6. The distance measuring device according to claim 1, wherein an outermost surface of a plane formed with the membrane has glossiness of less than 4% against an incident light with an incident angle of 85°, reflectance of 6% or less against a light having a wavelength of 905 nm, and an optical density of 1.5 or more.

7. The distance measuring device according to claim 6, wherein, on the outermost surface of the plane formed with the membrane, a maximum height Rz based on JIS B0601: 2001 is 7 μm or more, an average length Rsm of contour curve elements is 80 μm or more, a skewness Rsk of a contour curve is 0.3 or less, and Kurtosis Rku of a contour curve is 3 or more.

8. The distance measuring device according to claim 1, wherein the light emitting element and light receiving element are a part of at least one selected from a group composed of a LIDAR sensor unit, ToF camera unit and a millimeter radar unit.

9. An electronic apparatus, comprising the distance measuring device according to claim 1.

10. A mobile body comprising the distance measuring device according to claim 1.

11. The distance measuring device according to claim 1, wherein (B) is the inorganic-type particles.

12. The distance measuring device according to claim 11, wherein (B) consists of (B1) and (B2) and the total amount of (B1) and (B2) in 100% by mass of (B) is 100% by mass.

13. The distance measuring device according to claim 1, wherein (B) is the mixture of resin-type particles and inorganic-type particles.

14. An antireflection film, formed at least on a translucent cover of a distance measuring device comprising the translucent cover, which covers a light emitting element for emitting a detection light for measuring a distance to an object and a light receiving element for outputting a light-receiving signal in accordance with an amount of an incident light, and
the antireflection film is configured by a membrane having a thickness of 2 μm or more and 40 μm or less formed from a liquid composition by spray coating:
wherein
the liquid composition comprises at least (A), (B) and (C);
(A) is a resin component;
(B) is inorganic-type particles or a mixture of resin-type particles and inorganic-type particles;
(B) is contained in an amount of 20% by mass or more and 60% by mass or less in a total amount of 100% by mass of all solid content in the liquid composition;
(B) comprises (B1) and (B2), wherein a total amount of (B1) and (B2) in 100% by mass of (B) is 90% by mass or more, and a mass ratio of (B2) with respect to (B1) is 1.8 or more and 3.3 or less;

(B1) is inorganic-type small particles having a particle diameter ($d_1$) of 0.05 μm or more and 0.4 μm or less;

(B2) is inorganic-type large particles having a particle diameter ($d_2$) of 3 μm or more and 6 μm or less;

(B2) comprises silica, the silica comprises complex silica obtained by blackening silica with a colorant; and (C) is a diluent solvent.

15. The antireflection film according to claim 14, wherein (B) is the inorganic-type particles.

16. The antireflection film according to claim 15, wherein (B) consists of (B1) and (B2) and the total amount of (B1) and (B2) in 100% by mass of (B) is 100% by mass.

17. The antireflection film according to claim 14, wherein (B) is the mixture of resin-type particles and inorganic-type particles.

* * * * *